United States Patent [19]

Harris

[11] Patent Number: 5,360,671
[45] Date of Patent: Nov. 1, 1994

[54] THERMOPLASTIC POLYIMIDES AND COMPOSITES THEREFROM

[75] Inventor: Frank W. Harris, Akron, Ohio

[73] Assignee: The University of Akron, Akron, Ohio

[21] Appl. No.: 9,718

[22] Filed: Jan. 27, 1993

Related U.S. Application Data

[62] Division of Ser. No. 549,141, Jul. 6, 1990, abandoned.

[51] Int. Cl.$^5$ .................. B32B 27/00; B32B 27/06
[52] U.S. Cl. ................... 428/473.5; 428/260;
428/272; 428/274; 428/287; 428/288; 428/290;
428/294; 428/392; 428/393; 428/394; 428/395;
428/396; 428/408; 156/331.1; 156/325;
156/331.5; 264/135; 264/137; 264/258;
264/331.12; 264/331.19
[58] Field of Search ............ 528/353; 156/331.1,
156/325, 331.5; 428/473.5, 260, 274, 272, 287,
288, 290, 294, 392–396, 408; 264/137, 135, 258,
331.12, 331.19

[56] References Cited

U.S. PATENT DOCUMENTS

| | | | |
|---|---|---|---|
| 4,239,880 | 12/1980 | Darms | 528/125 |
| 4,271,288 | 6/1981 | Woo | 562/465 |
| 4,395,514 | 6/1983 | Edelman | 528/353 |
| 4,421,929 | 12/1983 | Woo | 528/351 |
| 4,485,140 | 11/1984 | Gannett et al. | 528/353 |
| 4,851,280 | 6/1989 | Gupta | 428/246 |
| 4,857,405 | 8/1989 | Cordova et al. | 428/394 |
| 4,880,584 | 11/1989 | Jones et al. | 264/331.19 |
| 4,902,453 | 2/1990 | Okura et al. | 264/135 |
| 5,002,823 | 3/1991 | Chen | 428/396 |
| 5,047,263 | 9/1991 | Glemet | 428/394 |
| 5,059,273 | 10/1991 | Boyce et al. | 428/473.5 |
| 5,066,536 | 11/1991 | Cogswell et al. | 428/473.5 |
| 5,076,872 | 12/1991 | Nakagawa et al. | 264/135 |
| 5,124,199 | 6/1992 | O'Quinn et al. | 428/473.5 |
| 5,141,804 | 8/1992 | Riefler et al. | 428/473.5 |
| 5,147,966 | 9/1992 | St. Clair et al. | 428/473.5 |
| 5,175,242 | 12/1992 | Harris | 528/353 |
| 5,178,964 | 1/1993 | Scola et al. | 428/473.5 |
| 5,238,638 | 8/1993 | Isayev | 264/258 |

OTHER PUBLICATIONS

CA 115(20):209172V, Harris et al, Nov. 18, 1991.
Mark W. Beltz–"Synthesis of Aromatic Polyimides Containing Oxyalkylene Linkages", Jul., 1987.

*Primary Examiner*—John Kight, III
*Assistant Examiner*—P. Hampton-Hightower
*Attorney, Agent, or Firm*—Oldham, Oldham & Wilson

[57] ABSTRACT

A new class polyimide and polyimide precursors based on diaryl oxyalkylene diamines, such as 1,3-bis[4-aminophenoxy]-2,2-dimethyl propane, a process for their preparation and their use as the continuous phase for the manufacture of composites and composite laminates reinforced by reinforcing agents such as carbon fibers, Kevlar TM, and other similar high strength reinforcing agents. The polyimides and molecular composites obtained from the diamines according to the invention show thermoplastic properties, excellent flex fatigue and fracture resistance, and excellent thermal and oxidative stability.

8 Claims, 2 Drawing Sheets

THERMOPLASTIC POLYIMIDES AND COMPOSITES THEREFROM

This invention was made with Government support under contract NAG-I-448 and NAG-I-779 awarded by NASA. The Government has certain rights in this invention.

This is a continuation of copending application Ser. No. 07/549,141 filed on Jul. 6, 1990 now abandoned

TECHNICAL FIELD OF THE INVENTION

The present invention relates to new diamines, new polyimide thermoplastics made from said diamines, new reinforced polyimide composites and laminates made from said polyimides and processes for their manufacture.

The present invention relates to: a new class of diaryl oxyalkylene diamines; new polyimides made from said diamines having improved thermal stability, high $T_g$, a relatively small temperature difference between $T_g$ and $T_m$ and thermoplastic properties; new high strength, low cost, fracture resistant, reinforced polyimide composites and laminates made from said polyimides where the composite is reinforced by fibrous materials such as carbon fibers or Kevlar ® and processes for their manufacture.

BACKGROUND OF THE INVENTION

Polyimides are useful as components which require excellent thermal, electrical and/or mechanical properties. For general discussion of polyimides preparation, characterization and applications see *Polyimides, Synthesis, Characterization and Applications*, K. L. Mittal, ed Plenum, N.Y. 1984.

Polyimides based on pyromellitic dianhydride and various organic diamines are disclosed in U.S. Pat. No. 4,485,140 to Gannett et al (E. I. DuPont de Nemours and Co.).

Polyimides based on diamines such as 2,2'-di-(p-aminophenyloxy)diphenyl and various dianhydrides are disclosed in U.S. Pat. No. 4,239,880 to Darms (Ciba-Geigy Corp.).

Harris et al. in U.S. patent application 07/315,327, has disclosed the preparation of soluble polyimides based on polyphenylated diamines. The polyimides taught in this reference are typically rod like polyimides and possess little if any thermoplastic properties.

In U.S. Pat. Nos. 4,271,288, 4,239,694 and 4,421,929, Woo (DOW Chemical Co.) teaches the use of certain tetracarboxylic acids as condensation monomers with diamines including oxyalkylene and alkyenedioxy diamines. Howeever, none of these diamines had geminal alkyl groups beta to the carbon atom bearing the aromatic amino end group.

Numerous patents deal with the manufacture of composites utilizing carbon fibers or other similar fibrous reinforcing agent with polyimides.

In U.S. Pat. No. 4,851,280, Gupta teaches the use of carbon fiber reinforced polyimide composites for fabricating tools. Gupta teaches the use of a different class of polyimides than those employed in the present invention.

In U.S. Pat. No. 4,395,514, Edelman teaches a process for the preparation of polyimide composites including carbon fiber reinforced polyimide composites. The main thrust of the Edelman patent is the use of a class of cyclic peroxyketal catalysts. Edelman teaches the use of divalent aryl radicals.

None of the above composite patents teach or insinuate that the diamines, polyimides or polyimide composites of the present invention would have the unusual properties of the above diamine, polyimides and polyimide composites.

DESCRIPTION OF THE INVENTION

We have discovered that a desirable new class of polyimides and polyimide compositions can be prepared from a new class of diaryl oxyalkylene diamines which can also be referred to as diaryl alkylene dioxy (both names may be used interchangeably throughout). These new thermoplastic polyimides and reinforced polyimide molecular or laminate composites have high fracture resistance, outstanding modulus, tensile, excellent oxidative stability, excellent energy absorption characteristics, very low coefficient of expansion, excellent thermal stability, excellent dielectric properties and less expense than most existing polymers. These properties will make the polyimides and polyimide components ideally suited for use in the production of high performance compositions.

It is an object of this invention to provide novel polyimides based on a new class of diaryl oxyalkylene diamines.

A further object of this invention is to provide novel polyimides based on the new diamines and a dianhydride or polymerizable equivalent thereof.

A further aspect of this invention is to provide novel copolyimides comprising repeat units based on the new diamines and one or more dianhydrides.

A further aspect of this invention is to provide novel copolyimides comprising repeat units based on the new diamines, one or more dianhydrides, and one or more diamines other than a diamine of the present invention.

A further object of this invention is to provide novel polyamides based on a new class of diaryl oxyalkylene diamines.

A further object of this invention is to provide novel polyamides based on the new diamines and a dicarboxylic acid or polymerizable derivative thereof.

A further aspect of this invention is to provide novel copolyamides comprising repeat units based on the new diamines and one or more dicarboxylic acid or polymerizable derivative thereof.

A further aspect of this invention is to provide novel copolyamides comprising repeat units based on the new diamines, one or more dicarboxylic acid or polymerizable derivative thereof, and one or more diamine other than a diamine of the present invention.

A still further object of this invention is to provide a novel class of diaryl oxyalkylene diamines and a process for manufacturing this new class of diamines.

Another object of this invention is to provide a novel class of dinitro precursor compounds and a process for manufacturing this new class of dinitro compounds.

A further object of this invention to provide novel polyimide and/or polyamide molecular composites where the polyimides are based on a new class of diaryl oxyalkylene diamines representing the continuous phase or matrix of the molecular composite when the reinforcing agent is a rigid fiber or fibrous material such as carbon fibers, Kevlar® fibers and the like or other fibers.

The new diamines of the present invention are shown in formula (I) below:

where $Ar^1$ is an aromatic group where the ether linkage and amine linkage are in a para arrangement.

The new aliamines of the formula (I) can be prepared according to the following scheme:

where $Ar^1$ is as previously defined and where X is a halogen atom being preferably F, Cl or Br.

Thus, 1,3-dihydroxy-2,2-dimethylpropane is reacted with 1-chloro-4-nitro benzene (X is chlorine and $Ar^1$ is phenyl in formula) (b) in the presence of a base to afford dinitro compound (c) where $Ar^1$ is phenyl. The base acts as a proton acceptor to neutralize the hydrohalic acid which is produced during the substitution reaction. Any base can be used, provided that the base is a poor nucleophilic so that the base will not compete with alcohol in the substitution exchange. Intermediate (c) where $Ar^1$ is phenyl is then reduced or hydrogenated to yield a diamine of formula (I) where $Ar^1$ is phenyl.

The conversion of intermediate (c) into a diamine of formula (I) occurs in the presence of a reducing agent or hydrogenating agent. The reduction or hydrogenation of intermediate (c) can be performed using well known agents such as iron or tin in an acid medium including ferrous sulphate, $SnCl_2$ or sodium hydrogen sulphate, titanium dichloride and/or tetrachloride in the presence of HCl, zinc in an acid or neutral medium, optionally with the addition of neutral salts, including $CaCl_2$ and $NH_4Cl$, lithium aluminum hydride, hydrazines, including hydrazine hydrate and phenylhydrazine, if necessary with the addition of Raney nickel catalysts, and sodium dithionite ($Na_2S_2O_4$). All the above reduction system are well known in the literature. Catalytic reduction or hydrogenation agents and procedures can also be used employing suitable commercial catalyst in the presence of hydrogen such as palladium, palladium-on-charcoal, platinum, platinum black, platinum oxide and, above all, Raney nickel. The catalytic reduction is appropriately carried out in a suitable inert organic solvent, such as dioxane.

The compounds of the intermediates (a) and (b) are preferably employed in stoichiometric amounts. However, the reaction can also be carried out with a slight excess of one or the other reactant. Intermediates (a) and (b) are known or can be manufactured easily in a manner which is in itself known.

The diamines of this invention can be used as polycondensation components for manufacturing novel thermoplastic homopolyimides and copolyimides by reacting the diamines of formula (I) with one or more dianhydrides of formula (II)

where Z is a tetravalent organic radical selected from the group consisting of a carbocyclic-aromatic containing radical and a hetero-cyclic aromatic containing radical where each anhydride group is located on an aromatic ring with the carbonyl units in an ortho orientation relative to one another and one or more diamine of formula (III)

where Q is a divalent organic radical selected from the group consisting of an aliphatic radical having at least 2 carbon atoms, a carbocyclic aliphatic radical, a carbocyclic aromatic containing radical, and a heterocyclic containing radical. The term carbo-cyclic aromatic containing radical and hetero-cyclic aromatic containing radical used to define Z, is meant to include any radical which has the anhydride groups attached to one or more aromatic ring(s) and when describing Q has the amine groups attached to one or more aromatic ring(s).

These diaryl oxyalkylene diamines are unique because of the geminal dimethyl substitution pattern at the carbon beta to the carbon atom bearing the oxygen atom (beta refers to the carbon one carbon atom removed from the carbon bearing a given substituent, in this case the aryl oxide substituent). Applicant speculated that the geminal substitution pattern at the beta carbon improves thermal stability by eliminating the ability of the ether to undergo carbon oxygen bond cleavage which yields a phenol and an alkene and degrades the polymer as shown below:

where P is used to evidence the remaining part of the polymer on either side of the ether linkage.

The resulting polyimides comprise from about 1 to 100 mole percent of a repeat unit formula (IV):

and from about 99 to 0 mole percent of a repeat unit of formula (V)

where $Ar^1$, Z and Q are as previously defined and $Z'$ is separately and independently an organic radical selected from the group defining Z.

The polyimides and copolyimides of the present invention are intended to include all manners of copolyimides incorporating at least 1 mol percent and preferably 5% to 10-20% and some cases 25-50% of repeat units of formula (IV). Since the repeat units of formula (IV) can include one or more polycarboxy compounds of formula (II), the resulting polymers can include any combination of polyimide repeat units.

In preparing the above polyimides, a mixture of diamines of formula (I) and/or diamines of formula (III) are reacted with a mixture of one or more dianhydride of formula (II). The amount of diamine and dianhydride should be close to a one to one molar mixture. However, 10% excess of either component is acceptable. Once the polymerization has been completed, the last component to react will determine the polymer end group. The polymer end groups can, thus, be an amino group, an anhydride group or a mixture thereof.

Alternately, a chain termination or limiting reagent can be added to the polymerization mixture to force termination of a growing polymer chain. Such chain termination or limiting reagents are used to limit the molecular weight of the polymer and are well known in the art. Amine termination reagents commonly employed include aniline or substituted anilines. Common carboxy terminating reagents include phthalic anhydride and other similar aromatic anhydrides.

Dianhydrides of formula (II) are selected from the representative and illustrative group consisting of: pyromellitic acid dianhydride, 3,6-diphenylpyromellitic dianhydride, 3,3',4,4'-benzophenonetetracarboxylic acid dianhydride, 2,3,3',4'-benzophenonetetracarboxylic acid dianhydride, 2,2',3,3'-benzophenonetetracarboxylic acid dianhydride, 3,3',4,4'-biphenyltetracarboxylic acid dianhydride, bis-(2,3-dicarboxyphenyl)-methane dianhydride, bis(2,5,6-trifluoro-3,4-dicarboxyphenyl)methane dianhydride, 2,2-bis-(2,3-dicarboxyphenyl)-propane dianhydride, bis(3,4-dicarboxyphenyl) ether dianhydride, bis-(3,4-dicarboxyphenyl)-sulfone dianhydride, N,N-(3,4-dicarboxyphenyl)-N-methylamine dianhydride, bis(3,4-dicarboxyphenyl)-diethylsilane dianhydride, 2,2bis(3,4-dicarboxyphenyl)-1,1,1,3,3,3-hexafluoro-propane dianhydride, 4,4'-[4,4'-Isopropylidenedi(p-phenyleneoxy)]bis(phthalic anhydride) which is derived from the General Electric bisphenol A ®, 2,3,6,7- and 1,2,5,6-naphthalene-tetracarboxylic acid dianhydride, 2,6-dichloronaphthalene-1,4,5,8-tetracarboxylic acid dianhydride, thiophene-2,3,4,5-tetracarboxylic acid dianhydride, pyrazine-2,3,5,6-tetracarboxylic acid dianhydride and pyridine-2,3,5,6-tetracarboxylic acid dianhydride as well as esters of the above listed compounds.

Diamines of formula (III) can be selected from the representative and illustrative groups consisting of: aromatic diamines such as, but not limited to, o-phenylenediamine, m-phenylenediamine, p-phenylenediamine, diaminotoluenes, 2,4-diaminotoluene, 1,4-diamino-2-methoxybenzene, 2,5-diaminoxylene, 1,3-diamino-4-chlorobenzene, 4,4'-diaminodiphenylmethane, 4,4'diaminodiphenyl ether, 4,4'-diaminodiphenyl thioether, 4,4'-diaminodiphenylsulphone, 2,2'-diaminobenzophenone, 4,4'-diaminodiphenylurea, 1,8-diaminonaphthalene, 1,5-diaminonaphthalene, benzidine, 3,3'-dimethyoxybenzidine, 2,2'-bis-(trifluoromethyl)benzidine, 2,2'-dimethylbenzidine, 2,2'-dichlorobenzidine, and other similarly substituted benzidines, 1,4-bis(2-methyl-4-aminopentyl)-benzene and 1,4-bis-(aminomethyl)-benzene; heterocyclic diamines such as, but not limited to, 2,6-diaminopyridine, 2,4-diaminopyrimidine, 2,4-diamino-s-triazine and other similar heterocyclic diamines.

The polycondensation reaction of the diamines of the formula (I) with one or more polycarboxy compound of the formula (II) and, optionally, one or more diamines of the formula (III) is carried out in a manner which is itself known. When the polyimides are prepared through the polyamide-acid precursor, then the polycondensation reaction or polymerization reaction can be carried out at temperatures from about −50° C. to +300° C. The reaction can be carried out in the melt if the components are meltable within the above stated temperature range or, preferably, in an inert organic solvent or a solvent mixture. For the preparation of polyamide-acids of the present invention, temperatures from 40° C. to 100° C. are preferred. When the neat polyimide is desired, then the reaction is carried out in the presence of a solvent in the temperature range from about 150° C. to about 325° C. This temperature range results in the direct formation of the polyimide during preparation and no subsequent imidization reaction, be it thermal or chemical, is normally needed. When preparing a prepreg, the polyamide-acid precursor is polymerized in the presence of a solvent to a low to moderate molecular weight so that the polymer solution viscosity is from about 1,000 to 4,000 centipoise at a temperature from about 40° C. to about 100° C.

Examples of suitable organic solvents are: chlorinated aromatic hydrocarbons, such as chlorobenzene and dichlorobenzenes, chlorinated aliphatic hydrocarbons, such as methylene chloride, chloroform, tetrachloroethane and tetrachloroethylene, aliphatic and cycloaliphatic ketones, such as acetone, methyl ethyl ketone, cyclopentanone and cyclohexanone, cyclic ethers, such as tetrahydrofurane, tetrahydropyrane and dioxane, cyclic amides, such as N-methyl-2-pyrrolidone, N-acetyl-2-pyrrolidone and N-methyl-a-caprolactam, N,N-dialkylamides of aliphatic monocarboxylic acids with 1-3 carbon atoms in the acid part, such as N,N-dimethylformamide, N,N-dimethylacetamide, N,N-diethylacetamide and N,N-dimethylmethoxyacetamide, hexamethylphosphoric acid triamide (hexametapol), N,N,N',N'-tetramethylurea, tetrahydrothiophene dioxide (sulfolane) and dialkylsulfoxides, such as dimethylsulfoxide and diethylsulfoxide.

Preferred solvents are N,N-dialkylamides of aliphatic monocarboxylic acids with 1-3 carbon atoms in the acid part, especially N,N-dimethylacetamide, as well as cyclic amides, such as N-methyl-2-pyrrolidone.

The condensation reactions are appropriately carried out with the exclusion of moisture, for example in an inert gas atmosphere, such as nitrogen.

Although polycarboxy compounds of formula II are shown in their dianhydride form, the esterified versions of these dianhydrides are also commonly used for the production of polyimide and are useful for polyimide formation using the diamines of formula (I). The ester process normally does not go directly to the polyimide but stops at a polyamide intermediate. This intermediate can then be thermally or chemically imidized to form the desired polyimide. Use can also be made of the polycarboxylic acid derivative of compounds of formula (II). The tetra carboxylic acids react analogously to the acid esters, forming a polyamide acid which is imidized to a polyimide. Any and all of these methods, well known in the art, can be used for making polyimides according to the present invention.

The reaction of the dianhydrides or their ester derivatives of the formula (II) with the diamines of the formula (I) and/or (III) can also be carried out stepwise, in order to manufacture intermediate polymers which, at least in part, have units of polyamide-acids and/or polyamide-esters. In these cases, the reaction is carried out in a manner which is itself known, using a slight excess of one or the other reactant in order to obtain prepolymers which have end groups suitable for the further reaction, (i.e., amino end groups, acid chloride groups and/or anhydride groups).

The cyclization or imidization of the polyamide-acids obtained after the condensation reaction to polyimide is carried out in a manner, which is itself known, by chemical means or by means of heat. Two general methods are used.

The chemical cyclization or imidization is appropriately carried out by treatment with a dehydrating agent on its own or as a mixture with a tertiary amine. Reagents which can be used are, for example, acetic anhydride and propionic anhydride or mixtures of acetic anhydride and triethylamine or similar tertiary amine.

The thermal cyclization or imidization typically can be carried out in two different procedures. If a polyimide precursor, such as a polyamide-acid, is imidized in the absence of solvent, then the imidization temperature can range from about 200° C. to about 300° C. If the polyimide precursor is imidized in the presence of a solvent, as would be the case if the polyimide was to be prepared directly, then the imidization temperature can range from about 150° C. to about 250° C.

The polyimides according to the invention, as well as the corresponding molecular or laminate composites using them as the continuous phase, are suitable for the manufacture of shaped articles of very diverse types, such as fibers, films, sheets, coating, foams, laminates, molding powders, pressed articles and the like, in a manner which is itself known, if desired, with the use of customary additives, such as pigments, fillers and the like.

When the polyimides are used in laminate composites, they usually represent the continuous phase, with the laminate being reinforced by an organic fiber. Typical organic fibers used as reinforcing agents in laminate composites include, but are not limited to, carbon fiber, polyamides, polyesters, and other high tensile strength high performance organic fibers. However, inorganic and metallic fibers can also be used.

The composites of the present invention may be formed by any technique which is generally known in the art, including, but not limited to: compression molding, autoclaving, injection molding and other similar techniques. One particularly preferred technique used in the present invention involves taking a fabric composed of the fibrous material that is to be the reinforcing agent, dipping it into a preimpregnation dip containing a solution of a polyamide-acid and/or polyimide having low to moderate molecular weight so that the polymer solution viscosity will be in the range from about 1,000 to 4,000 centipoise (cp) and preferably from about 1,000 to 3,000 cp. The dip coats the fibers and fills the interstices between the fiber in the fabric. The prepreg step generally uses a lower molecular weight form of the polyimide precursor, polyamide-acid, followed by a subsequent thermal conditioning step of the entire composite to yield a fully polymerized and imidized, tough and durable laminate composite.

The laminate composites generally have from 4 to 30 layers of dipped fabric per composite. Typically the composite is made up of sets of smaller laminate composites consisting of from about 2 to about 6 dipped fabric layers with the orientation of the fabrics all in the same direction for the smaller laminate composite. However, composites with many layers of the same or differing orientation relative to one another can be prepared directly.

Figure 1:
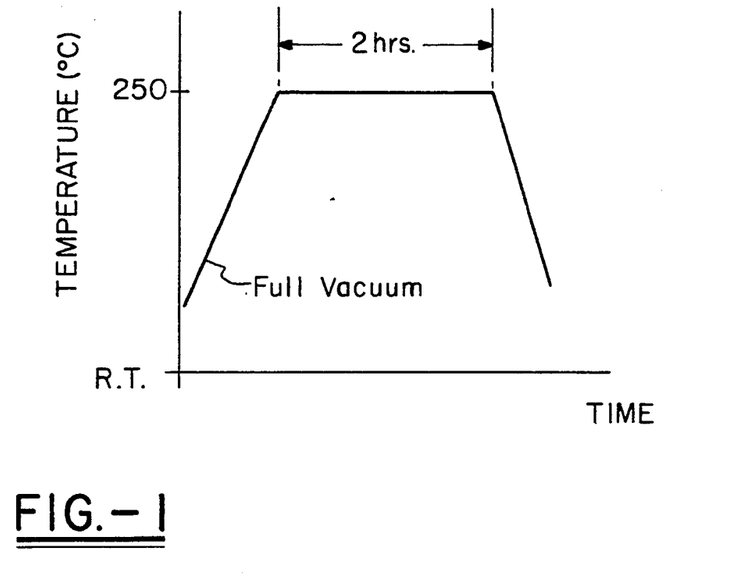
FIG. 1 illustrates a prepreg drying cycle showing a heating ramp under vacuum followed by a one hour hold time at 250° C. followed by a rapid cooling ramp still under vacuum.
Figure 2:
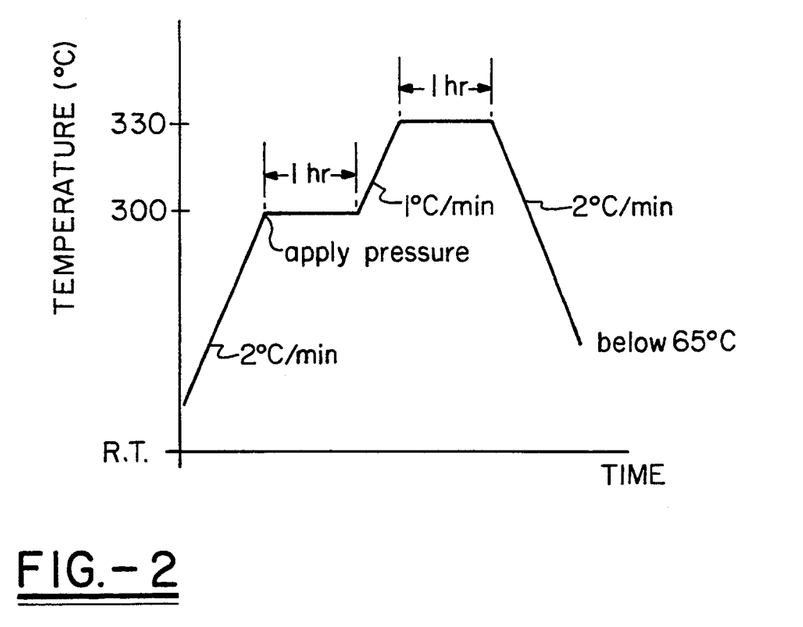
FIG. 2 illustrates a compression molding cycle showing a heating ramp at 2°/min. to 300° C., an hour hold under pressure, a second heating ramp at 1°/min., an hour hold still under pressure, followed by a 2°/min. cooling ramp under pressure to a temperature below 65° C.

For compression molding, the small laminate structures are dried in a drying cycle as shown in FIG. 1. After drying, the small composites are assembled into a larger composition where the larger composite can have from about 3 to 6 small components. The large composite can be structured in such a way as to have all the fabric running the same direction, i.e. anisotropic, or all running in different directions to simulate an isotropic final structure. The large or small laminates can then be compression molded using a compression molding cycle similar to that shown in FIG. 2. The final temperature for curing is from about 300° C. to about 350° C.

Alternately, the laminate structures can be placed in an autoclave and subjected to heat and pressure to affect laminate pretreatment. This is normally done at moderate temperatures from about room temperature to about 120° C. to about 250° C. and is meant as a mechanism for degassing the laminate layers and to increase the interpenetration of the dip coating on fabric layers so that a more uniform and stronger composite is obtained. The pretreated small laminates are then put together in a desired direction orientation of reinforcing fiber to obtain the desired final composition properties. Typically, the number of smaller composites that go into making the larger composite is between from about 3 to about 6 or 10.

The laminate structures can then be cured by autoclaving or compression molding which completes any imidization of polyimide precursors and/or completion of the polymerization of lower molecular weight polyimides to the thermoplastic polyimides. The final curing temperature is typically from about 250° C. to about 350° C. However, higher temperature may be used.

Composites obtained through these methods, or other methods for making composites using polyimide of this invention, are very tough and durable, show good thermal and structural integrity and have unusually high fracture energies, meaning that they are extremely resistant to impact fracturing and fatigue fractures. They also show enhanced thermal stability in that the $T_g$ of the polyimides of this invention are from about 200° C. to about 260° C. and their melting points are in the range between about 300° C. and 360° C. The difference between the polymer's $T_g$ and its melting point temperature $T_m$ directly effect the processing properties of thermoplastic. The higher the $T_g$, the higher the temperatures that the final composites can withstand. The lower the $T_m$, the easier the polyimides will be to process.

The composites of this invention are derived from a polyimide having a relatively high $T_g$, a relatively small difference between $T_g$ and $T_m$, and thermoplastic properties. The composite comprises a polyimide or polyimide precursor and a reinforcing fiber, the precursor being characterized by the ability to be imidized to the polyimide. The polyimide is characterized by having some repeat units of formula (IV). The polyimides can be copolyimides which have some repeat units of both formulas (IV) and (V), but the polyimides or polyimide precursors are preferred which have only units of formula (IV). The fiber used to make the composites of the present invention can be selected from the representative and illustrative group consisting of carbon fibers and other carboneous fiber material, polyamide fibers, polyester fibers, polyimide fibers, cellulose fibers and cellulose derived fibers and other high strength fiber (viz., organic or inorganic) used in composites.

The process for making composites based on a polyimide having relatively high $T_g$, relatively small difference between $T_g$ and $T_m$, and thermoplastic properties comprises the steps of: 1) pre-pregging a fiber with a polyimide or a polyimide precursor solution; 2) preconditioning said pre-pregged fiber; 3) layering said pre-pregged fiber into a composite; 4) forming said composite into a shape; and 5) curing said composite into a desired shape. The preferred fiber for use in the composites of the present invention are preferably carbon fibers or carboneous fibers. Also, some layered fibers may be of different polyimides.

A competing material that utilizes polyether-etherketone resins (PEEK) as the continuous phase in laminate composites, has the major disadvantage that the $T_g$ of the PEEK polymer is around 145° C. Therefore, the composite's upper temperature threshold is approximately 110° C. to 115° C. Typically polymers used for structural application are subject to creep and/or stress induced creep at temperatures approximately thirty degrees below their $T_g$ where molecular motion becomes more exaggerated in the polymers. $T_g$ is the transition temperature from a glassy state into a more mobile state and where the polymer can begin to creep.

In the case of polyimides of the present invention, their $T_g$ is from about 200° C. to 260° C. thus giving them an upper temperature threshold in the range of 170° C. to 230° C. for structural applications. However, it should be recognized that the polyimides of the present invention can be used above their $T_g$ for non-structural applications. Another advantage of the present polyimides in molecular composites is that their melt temperature is lower than PEEK. Therefore, the molecular composites will need less energy to manufacture. It can be seen from the discussion above, that one desirable quality of a polyimide useful for laminate composites, is that the $T_g$ be as high as possible and the $T_m$ be as low as possible. Such polymers will show advantageous properties because they require less energy to process in the manufacturing of the laminate or composites and the temperature under which the composites can operate are as high as possible.

The present invention uses a prepreg dip step, followed by preconditioning of small laminate structures and a build up to larger laminate structures that are preconditioned and then autoclaved. Alternate techniques for the formation of laminate composites and molecular composites can be used and are well known in the art, including but not restricted to: compression molding, injection molding and other similar molding technology.

The diamines of formula (I) can also be utilized in the manufacture of polyamides. Polyamides are typically formed from the reaction of a diamine with a dicarboxylic acid or acid derivative as shown in Formula (VI)

(VI)

where G is a divalent radical selected from the representative and illustrative group consisting of an aliphatic radical, cycloaliphatic radical, carboxylic aromatic radical or a heterocyclic aromatic radical and Y is selected from the representative and illustrative group consisting of hydroxy, alkoxy, alkoxy having from about 1 to about 16 carbon atoms and chlorine.

The polyamides can also include copolymers having 1 to 100 mol percent of a repeat unit of Formula (VII)

(VII)

and from about 0–99% of a repeat unit of Formula (VIII)

(VIII)

where $Ar_1$, G and Q are as previously defined and G' is separately and independently a divalent organic radical selected from the group that defines G. These polyamides represent a class of thermoplastics with high $T_g$'s and $T_m$'s which can be used in the formation of molecular composites or in the formation of polyamide films, fibers or molded shapes. The process for making the polyamides based on diamines of Formula (I) and one or more diamines of Formula (III) and one or more dicarboxylic acid derivatives of Formula (VI) are similar to the methods for preparing polyimides and can be done in either a small excess of the diamines or a small excess of the dicarboxylic acid derivatives. The reaction can be performed in solution using the same type of solvents that are used in the formation of polyamides as were listed above.

Representative compounds of Formula (VI) are selected from the representative and illustrative group consisting of: malonic acid, dimethylmalonic acid, succinic acid, glutaric acid, adipic acid, suberic acid, sebacic acid and dodecanedicarboxylic acid, 1,3-cyclopentane-dicarboxylic acid, hexahydroisophthalic acid, hexahydroterephthalic acid, terephthalic acid, isophthalic acid, 4,4'-dicarboxydiphenylethane, naphthalene-2,6-dicarboxylic acid, thiophene-2,5-dicarboxylic acid and pyridine-2,3-dicarboxylic acid as well as the corresponding dichlorides and diesters according to the definition.

Polyamides of this invention can also be reacted in the presence of a chain limiting reagent, similar or identical to the chain limiting reagents that are used in the formation of polyimides of the present invention. The chain terminating agents can be either of an amine form or a carboxylic acid derivative form and can include such species as aniline or aniline derivatives or benzoic acid or benzoic acid derivatives.

BEST MODE FOR CARRYING OUT THE INVENTION

Applicant has found that the polyimides or polyamides derived from diamines of formula (I), or copolymers having at least 1 mol percent of repeat units derived from diamines of formula (I), represent a new and novel class of high performance thermoplastics and components for making composites where the reinforcing agent is a fiber or fibrous material such as carbon fiber, polyester, Kevlar ® and the like. The composite properties based on polyimides or polyamides of the present invention show high modulus, high tensile and compression strength, high energy absorption, low coefficient of expansion, low electrical properties, high resistance to fracture fatigue and high thermal stability due to the relatively high $T_g$.

In preparing the homopolyimides of the present invention which contain 100% of repeat units of structure (II), a near one to one mixture of a diamines of formula (I) such as 1,3-bis[4-aminophenoxy]-2,2-dimethyl propane, where $Ar^1$ is phenyl, and a dianhydride of formula (II) such as 3,3',4,4'-benzophenone tetracarboxylic dianhydride, where Z is benzophenone are allowed to react under the above stated reaction conditions to form a polyimide.

In preparing the copolyimides consisting of 1 to 100 mol percent of repeat units of formula (IV) and 99 to 0 mol percent of repeat units of formula (V), it is understood that a given molar amount of a combination of one or more diamines of formula (I) and one or more diamines of formula (III) is mixed with a nearly equal molar amount of one or more dianhydride of formula (II). The diamines of the formula (I) in which both $Ar^t$ group are phenyl are preferred although napthyl, tolyl, benzidyl and related groups may be used. Polyimides consisting of only repeat units of formula (IV) are particularly preferred. However copolyimides having 50–99 mol percent of repeat units of formula (IV) and 1–50 mol percent of repeat units of formula (V) are of interest because these copolyimides allow the expression of properties of the diamines of formula (I), the enhanced fatigue and fracture resistance and high temperature stability properties of the polyimides, and minimize the increased cost of the resulting polyimides by using diamines of formula (I) in copolymers of the present invention.

In all the above polymers indicated by 1 to 100 mol percent of repeat units of formula (IV) and 99 to 0 mol percent of repeat units of formula (V), the end groups of the polymers can be either an amine, an anhydride or a combination of these groups. The reaction can also be carried out in the presence of a chain limiting reagent such as a mono functional amine containing organic reagent or a mono functional anhydride containing organic reagent. These chain limiting reagents actually stop polymerization by introducing a non-reactive group at the end of a polymer chain. In the case of anhydride chain limiting reagents, the reagents include but are not limited to, a phthalic anhydride, or other similar aromatic anhydrides. In the case of organic amine chain limiting reagents, the reagents include but are not limited to aniline, alkyl substituted anilines, or naphthyl amines.

The laminate composites that are taught in this application are made by a technique that involves predipping or pre-pregging a fabric, preferably a fabric form of the fiber, made up of a particular reinforcing fiber such as carbon fiber or Kevlar ® or any other type of high temperature, high tensile strength fabric fiber in a solution of the polyimide precursor such as polyamide-acid or polyamide-ester or a mixture thereof, or the polyimide polymerized to a given molecular weight. The molecular weight of the polyimide or polyimide precursors can be controlled by the addition of the chain termination agents being either a form of simple aromatic anhydride or simple aromatic amine as taught above or by controlling the polymerization reaction time and temperature. The molecular weight of the prepolymer and the type of capping group utilized in the preparation of the laminates does impact the type of final properties that the laminate composites will exhibit. Typically, the pre-dip solution has a viscosity from about 1,000 to 4,000 cp and preferably from about 1,500 to about 3,000 cp, usually at 10–50% by weight solution and preferably from about 10–23% solids.

Two modes of laminate preparation were used in the present invention. Both require predipping a fabric, layering the dipped fabric to form a composition having from about 2 to about 30 layers, preconditioning the composite or laminate, followed by a heat and pressure treatment to cure the laminate. In the case of compression molding, the typical curing temperature is from about 300° C. to 350° C. and typical curing pressure is from about 2,000 to about 3,500 psi, preferably from about 2,500 to about 3,250 psi. In the case of autoclaving, the typical curing temperature is from about 300° C. to 350° C. and typical curing pressure is from about 100 to about 300 psi, preferably from about 150 to about 250 psi.

The second technique involves autoclaving the laminate products to precondition the composites and/or cure the composites. The preconditioning step is used for each composite structure, regardless of whether or not the structure will be a part of a larger structure or is complete in and of itself. Autoclaving is preferred because more uniform composites are made over the more conventional compression molding process. The preconditioning step is normally carried out at ambient temperature or up to about 250° C.

The polyimides of this invention have a preferred $T_g$ from about 200° C. to about 250° C., a preferred $T_m$ from about 300° C. to about 350° C., and a preferred difference between $T_g$ and T, from about 50° C. and about 150° C. These values allow the composites to have good thermal stability and a good processing window.

The invention will be better understood by reference to the following examples which are included for purposes of illustration and not limitation. The following terms which are used throughout the examples and claims have the following definitions: g—gram(s), mol—mole(s), mL—milliliter, L—liter(s)

EXAMPLE 1A

PREPARATION OF DINITRO INTERMEDIATE OF FORMULA (c).

This example describes the preparation of 1,3-bis(4-nitrophenoxy)-2,2-dimethyl propane, a dinitro intermediate of formula (c), where $Ar^1$ is phenyl.

4-Chloronitrobenzene (0.194 mol, 30.6 g) and 2,2-dimethyl-1,3-propanediol (0.096 mol, 10.0 g) were added to a 500 mL 3-neck round bottom flask equipped with a reflux condenser, a mechanical stirrer and a nitrogen inlet. N,N-Dimethylacetamide (DMAC) (40 mL) was added along with potassium carbonate (anhydrous, 0.15 mol, 21.2 g), and the heterogenous mixture was heated to reflux under a nitrogen atmosphere. The yellow mixture soon darkened to brown and a white precipitate formed on the side of the round bottom flask. The mixture was heated at reflux for 24 hours, allowed to cool to room temperature and then poured into ice water and neutralized to pH 7 with HCl (conc.). The crude product was collected by filtration, washed with water, then stirred in hot ethanol, recollected by filtration, air dried and recrystallized from ethyl acetate to give pale yellow prisms. Yield: 25.2 g (0.07 mol, 76%) MP: 165°–166° C.

EXAMPLE 1B

This example describes the preparation of 1,3-bis(4-nitrophenoxy)-2,2-dimethyl propane, a dinitro intermediate of formula (c), where $Ar^1$ is phenyl.

4-Chloronitrobenzene (1.25 mol, 197 g) and 2,2-dimethyl-1,3-propanediol (0.5 mol, 52 g) were added to a 500 mL 3-neck round bottom flask equipped with a reflux condenser, a mechanical stirrer and a nitrogen inlet. Dimethylsulfoxide (DMSO, 215 mL) was added along with potassium carbonate (anhydrous, 1.75 mol, 103.5 g), and the mixture was stirred at reflux for 24 hours. The dark brown mixture was allowed to cool to room temperature, poured into ice water, neutralized to pH 7 with HCl (conc.), filtered and washed with water. The precipitate was then stirred in hot ethanol, filtered and washed with diethyl ether. The crude product was recrystallized from ethyl acetate to give pale yellow prisms. Yield: 132 b (0.37 mol, 73%) MP: 1.64°–166° C.

EXAMPLE 2A

PREPARATION OF DIAMINES OF FORMULA (I)

This example illustrates the preparation of 1,3-bis(4-aminophenoxy)-2,2-dimethyl propane by reduction of the dinitro compound prepared in Example 1.

1,3-Bis(4-nitrophenoxy)-2,2-dimethylpropane (0.23 mol, 80.0 g) and palladium on activated carbon (5%, 1 g) were added to a 2 liter 3-neck flask equipped with a mechanical stirrer, reflux condenser and an additional funnel. Ethanol (abs. 1.3 L) was added and the mixture was heated to solution. Hydrazine monohydrate (1.6 mol, 80.1 g) was added to the addition funnel and then added dropwise to the reaction solution. Once the addition was completed the solution was heated at reflux for 6–8 hours, filtered hot through celite and evaporated to give the product as an off-white powder. Yield: 26 g (0.09 mol, 100%) MP: 116°–117° C.

EXAMPLE 2B

This example illustrates the preparation of 1,3-bis(4-aminophenoxy)-2,2-dimethyl propane by reduction of the dinitro compound prepared in Example 1.

1,3-Bis(4-nitrophenoxy)-2,2-dimethylpropane (0.09 mol, 31 g) was placed in a hydrogenation flask along with palladium on activated carbon (5%, 0.8 g) and in absolute ethanol. The reaction mixture was flushed three times with hydrogen then pressurized to 60 psi and reacted until no further decreases in pressure were observed. The solution was filtered through celite to remove the carbon and the filtrate was evaporated to give the product as an off-white powder. Yield: 26 g (0.09 mol, 100%) MP: 115°–116° C.

GENERAL POLYIMIDE PREPARATION

EXAMPLE 3A

This example illustrates the preparation of a homopolyimide of 3,3',4,4' benzophenone tetracarboxylic dianhydride (BTDA) and 1,3-bis (4-aminophenoxy)-2,2-dimethyl propane ( BAPDMP).

BAPDMP (0.0179 mol, 5.1253 g) was added to a resin kettle and dissolved in N-methylpyrrolidone (NMP, 50 mL). BTDA (0.0179 mol, 5.7670 g) was added and reacted at room temperature for 24 hours. The inherent viscosity of the polyamide-acid precursor at this point is 1.0 dL/g at 30° C. and 0.5 g/dL in NMP. Pyridine (0.0269 reel, 2.1 g) was added and after 15 minutes acetic anhydride (0.0269 mol, 2.7 g) was added. The viscous solution was stirred for 24 hours at room temperature and then precipitated into ethanol (1.5 L). The polymer was filtered, washed with ethanol and then dried at 120° C. for two hours and at 250° C. for two hours under vacuum.

Polyimide properties: fracture energy=4.28 kJ/m², elastic modulus=3.0 GPa, density=1.31 g/cm³ at 23° C., $T_g$=235° C., and $T_m$=322° C. The polyimide has good solvent resistence in the case of most organic solvents being essentially insoluble once the polyimide is formed.

EXAMPLE 3B

This example illustrates the preparation of a homopolyimide of bis-(3,4-dicarboxyphenyl) ether dianhydride also named 4,4'-oxydiphthalic dianhydride (ODPA) and 1,3-bis(4-aminophenoxy)-2,2-dimethyl propane (BAPDMP).

BAPDMP (0.00528 mol, 1.51 g) was added to a resin kettle and dissolved in N-methylpyrrolidone (NMP, 21 mL). ODPA (0.00528 mol, 1.64 g) was added and reacted at room temperature for 24 hours. Triethylamine (0.00792 mol, 1.1 mL) was added and after 15 minutes acetic anhydride (0.0792 mol, 0.75 mL) was added. The viscous solution was stirred for 24 hours at room temperature and then precipitated slowly into ethanol (1.5 L) with rapid stirring. The polymer was filtered, washed six times with ethanol and then dried at 125° C. for two hours and at 250° C. for two hours under vacuum. The yield was 2.7 g of a pale yellow fibrous polymer.

Polyimide properties: $[\eta]_{inh}=0.83$ dL/g at 30° C. at 0.5 g/dL concentration, $T_g=219°$ C., and $T_m=295°$ C. However, upon rescan in a DSC the $T_g$ remained about 219° C., but the $T_m$ disappeared completely indicating the formation of an amphorous polyimide.

EXAMPLE 3C

This example illustrates the preparation of a homopolyimide of 3,3',4,4' biphenyl tetracarboxylic dianhydride (BPDA) and 1,3-bis (4-aminophenoxy)-2,2-dimethyl propane (BAPDMP).

BAPDMP (0.00699 mol, 2.00 g) was added to a resin kettle and dissolved in N-methylpyrrolidone (NMP, 27 mL). BPDA (0.0699 tool, 2.05 g) was added and reacted at room temperature for 24 hours. Triethylamine (0.01048 mol, 1.45 mL) was added and after 15 minutes acetic anhydride (0.01048 mol, 0.99 mL) was added. The solution became very viscous after about one hour. The viscous solution was stirred for 24 hours at room temperature and then precipitated into ethanol (1.5 L). The polymer was filtered, washed with ethanol and then dried at 120° C. for two hours and at 250° C. for two hours under vacuum. The reaction yield was 3.7 g of a dark-yellow polymer.

Polyimide properties: $[\eta]_{inh}=0.99$ dL/g at 30° C. in m-cresol at a concentration of 0.5 g/dL, $T_g=260°$ C. (very weak), and $T_m=359°$ C. However, upon rescan in a DSC the $T_g$ became real broad at about 250° C., but the $T_m$ disappeared completely indicating the formation of an amorphous polyimide. A third scan showed a very weak and broad possible $T_g$ centered at about 250° C.

POLYIMIDE RESIN

EXAMPLE 3D

This example illustrates the preparation of the neat polyimide of 1,3-bis(4-aminophenoxy)-2,2-dimethyl propane (BAPDMP) and 3,3',4,4'-benzophenone tetracarboxylic dianhydride (BTDA) in m-cresol.

BAPDMP (7.3088 g, 0.0255 mol) and BTDA (8.2239 g, 0.0255 mol) were added to a 250 mL round-bottom flask equipped with a mechanical stirrer, a nitrogen inlet and a short-path distillation head. After m-cresol (112 mL) and isoquinoline (3 drops) were added, the solution was heated at 200° C. for two hours while the water of imidization was removed by distillation. Toluene may be added as an azeotroping agent. The viscous reaction mixture was agitated with 600 mL of ethanol to precipitate the fibrous product. The polymer was collected by filtration and dried at 250° C. under reduced pressure for four hours.

EXAMPLE 3E

END-CAPPED POLYAMIDE ACID

This example illustrates the preparation of an end capped polyimide of BAPDMP and BTDA capped with Phthalic anhydride.

BAPDMP (40.3667 g, 0.1410 tool) and BTDA (43.1500 g, 0.1339 tool) were placed in a resin kettle in the presence of NMP (15. I mL) followed by the addition of Phthalic anhydride (2.0855 g, 0.0141 mol) (the chain terminating agent) and reacted at room temperature for 24 hours. The end-capped polyamide-acid was recovered from methanol (9.0 g, 11.4 mL, 0.28 mol).

EXAMPLE 4

PREPARATION OF A HOMOPOLYIMIDE PREPREG SOLUTION

This example illustrates the preparation of a homopolyimide prepreg solution of BTDA and BAPDMP.

BAPDMP (50.4 g, 0.18 mol) was slurried in 58 mL of THF at room temperature. The mixture was stirred and heated to near 80° C. under nitrogen until the BAPDMP dissolved (ca. 10 minutes). Solids content of this solution was about 50% (w/w). NMP (36 mL) was added to a resin kettle containing 57.9 g (0.18 mol) of BTDA. The resulting white slurry was stirred under nitrogen while 14.6 mL (0.36 mol) of methanol was added. The slurry was heated to ca. 80° C. for about one hour to afford a clear solution. The above prepared solution of BAPDP was carefully added to the diester solution at 80° C. The flask and the addition funnel were washed with 50 mL of THF and the resulting mixture was stirred and heated at 80° C. for two hours. THF was removed under reduced pressure until the viscosity of the prepreg solution reached 2,000–4,000 centipoise measured on a Brookfield viscometer. The solution was then used to coat T-40 12K carbon fibers at 60° C. The coated carbon fabric was then subjected to a heating cycle under reduced pressure as shown in FIG. 1. The temperature was taken from 80° C. up to 200° C. The dipped fiber was held for two hours at 250° C. under vacuum and then allowed to cool to room temperature. Laminates of either organic or inorganic fibers can be made as above.

EXAMPLE 5

PREPARATION OF A COMPRESSION MOLDED LAMINATE

This example describes the preparation of a compression molded laminate using the prepreg fabric from Example 4. Four to ten layers of prepreg fabric from Example 4 are layered on top of one another in any combination of orientations including all the fabric having the fibers in the same orientation or a combination of fibers in one direction followed by a set of fibers in another direction, followed by a set of fibers in another direction, to form a composite composition where the fibers are oriented in different directions to allow the final composite to have more uniform properties. The composites are then compression molded according to the compression molding cycles shown in FIG. 2. The temperature is first raised from room temperature to 300° C. at two degrees per minute. A pressure of 3,000 psi was then applied for one hour. The pressurized heated composite was then heated again at one degree per minute to a temperature of 330° C. and held under pressure for one hour, at which point the composite was cooled at two degrees per minute under pressure to below 65° C. at which point the pressure is removed. The compression molding was performed by placing the layered composite between a porous ply glass cloth and a steel plate on either side and pressure of 3,000 psi was applied to the two steel plates to cause the sandwich laminate to be subjected to pressure and temperature. The composite has the final properties shown on Tables I and II.

TABLE I

|  | Room Temperature | 250° F. Dry | 250° F. Wet | 350° F. Dry |
|---|---|---|---|---|
| Shear strength (short-beam) | 94.0 MPa | 67.2 MPa | 63.7 MPa | 53.2 MPa |
| Flexural strength (3-point bend) | 1283.0 MPa | 785.0 MPa | 728.0 MPa | 560.0 MPa |
| Flexural Modulus (3-point bend) | 113.0 GPa | 116.0 GPa | 113.0 GPa | 118.0 GPa |

TABLE II

Isothermal Aging Study of PI-2/T-40 Composites at 200° C. in Air

|  | Flexural Strength MPa | Flexural Modulus GPa |
|---|---|---|
| Initial | 1054 | 99.6 |
| One Day | 1216 | 126.3 |
| One Week | 1147 | 134.7 |
| Two Weeks | 1148 | 109.7 |
| Three Weeks | 1212 | 98.6 |
| One Month | 1216 | 98.0 |

It is apparent from the data presented in Tables I and II that the composites of the present invention show excellent high temperature behavior with respect to shear and flexural strength and flexural modulus. The composites do not show significant strength loss until temperature of 350° F. are attained. The composites of this invention also show only a small decrease in strength at 250° F. when the composites are subjected to wet conditions. The composites of this invention as indicated in Table II also show excellent thermal stability in both modulus and strength (Flexural) on long term aging. Thus, after one month of air aging at 200° C. the composites shown have undergone only a modest rise in strength from an initial value of MPa to a value of 1216 MPa and a change in modulus over time which appears to return the modulus to nearly its initial value of 99.6 GPa. The data may also indicate that after three weeks of aging at 200° C. that the composite has reach an state of equilibrium.

AUTOCLAVE PREPARATION OF COMPOSITES

EXAMPLE 6

This example illustrates the autoclave preparation method for curing composites made from the polyimides described in Examples 3 according to fiber prepreg, according to Example 4.

Materials

The following materials were used for autoclave curing: bagging film was Kapton film; sealant tape was GS 900 (works up to 900° F.); release fabric was non-porous teflon coated glass cloth; peel plies were porous teflon coated glass cloth; bleeders for absorbing resin ooze and allowing solvent escape; and autoclave tool.

Tool Assembly

First the release fabric was placed on the curing part of the tool. A bleeder lay was then placed on top of the release fabric and a peel ply was place on top of the bleeder. Next the pre-pregged fabric, according to Example 4, of any appropriate size was stacked into a composite laminate of any number of layers and was placed on top of the peel ply. A second peel ply was placed on top of the composite followed by a second bleeder. The bagging film was then placed over the above assembly and taped to the tool with the sealant tape. The autoclave tool was designed to allow the bag to surround the composite and to allow the composition region inside or under the bag to be subjected to a vacuum, while up to 300 psi of pressure is applied to the outside or top of the bag. The tool has a top and bottom and the bag was secured between the top and bottom part of the tool. Thus, the bag acted as a barrier between the composite assembly under the bag, which can experience a vacuum from the top of the bag, which can experience pressure. The vacuum allowed purging of volatiles while the pressure insured curing.

Composite Curing

Figure 3:
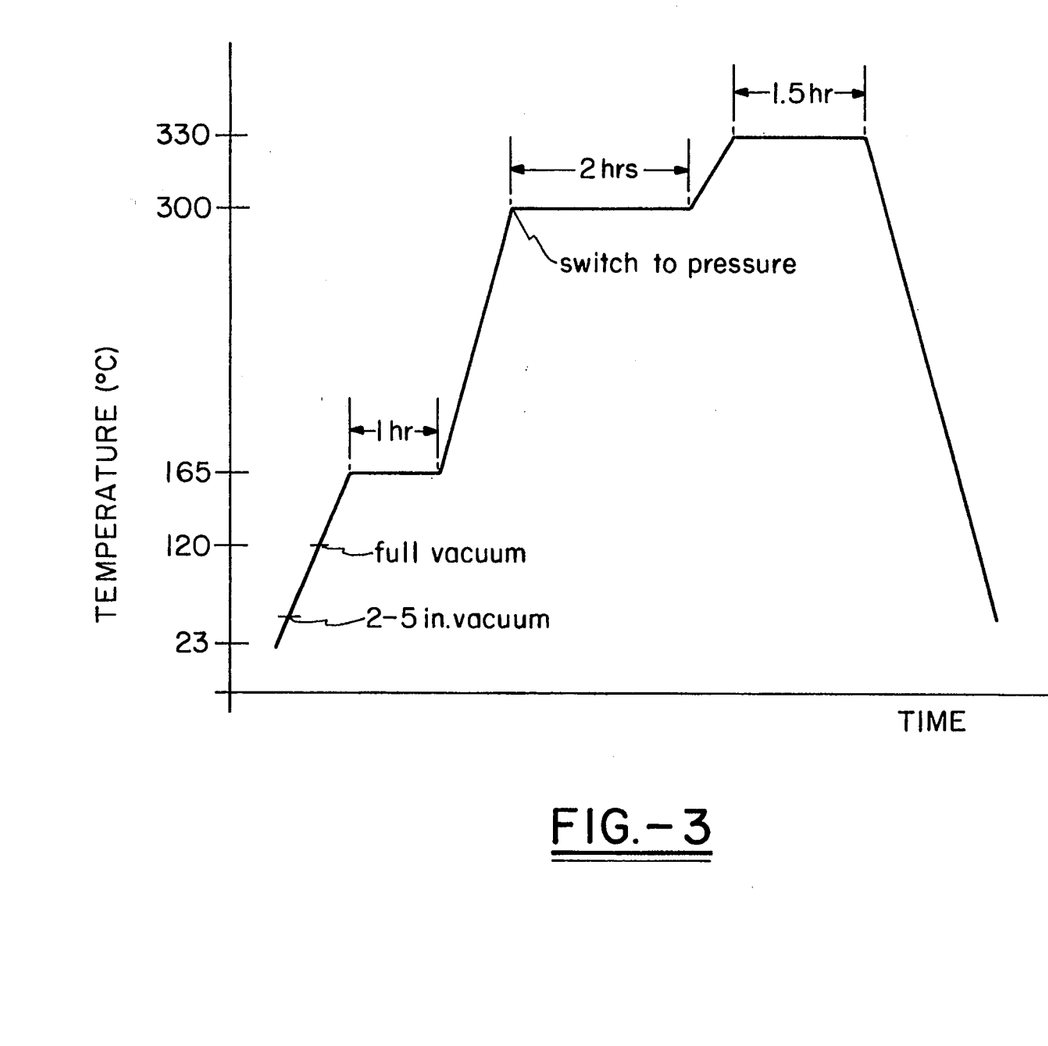
FIG. 3 illustrates an autoclave curing cycle for the composites of the present invention showing an initial heating ramp taking the composite to 165° C. with a one hour hold. During the heating, a vacuum is applied partially at first and fully about ¾ through the first heating ramp. After the one hour hold, a second heating ramp is applied raising the temperature to 300° C. Once 300° C. is attained, pressure is switched on and the temperature is held for two hours, followed by a third heating ramp to 330° C. holding for one and a half hours, followed by a cooling ramp back to ambient temperature.

The tool housing the composite was subjected to the curing cycle shown in FIG. 3. The temperature was raised from room temperature at a rate of 1.5° C./min. under a vacuum of 2-5 inches until the temperature reached 120° C. at which point full vacuum was applied and heating continued until a temperature of 165° C. was attained. The temperature was maintained at 165° C. for one hour under full vacuum. After one hour, heating was resumed at 1.5° C./min. to a temperature of 300° C. where the vacuum was discontinued and pressure was begun slowly and increased over a 15 minute period of time culminating in full pressurization at 200 psi. The system was held under full pressure at 300° C. for two hours. The temperature was ramped up again to 330° C. at 1° C./min. and held at 330° C. for one and a half hours under full pressure. The assembly was cooled at 1.5° C./min. under full pressure. The pressure was released when the temperature dropped below 65° C. The assembly was decomposed and the composition was removed. The above obtained composition had similar properties to the composite made by compression molding.

It should be recognized that any polyimide or combination of polyimides containing some of a diamine of formula (I) can be used in the above composite construction and curing along with a mixture of fibers.

While in accordance with the patent statutes the best mode and preferred embodiment of the invention have been described, it is to be understood that the invention is not limited thereto, but rather is to be measured by the scope and spirit of the appended claims.

What is claimed is:

1. A composite derived from a polyimide having a $T_g$ from 200°-260° C. and a $T_m$ of from 300°-360° C. and a difference between $T_g$ and $T_m$ from 40°-160° C., and thermoplastic properties comprising:

(a) a polyimide or polyimide precursor, the precursor being characterized by the ability of being imidized to the polyimide, the polyimide being characterized by having from about 1 to 100 mole percent of a repeat unit formula (IV) and from about 99 to 0 mole percent of a repeat unit of formula (V); and (b) a reinforcing fiber being selected from the group consisting of carbon fibers, polyamide fibers, polyester fibers, polyimide fibers, cellulose fibers and cellulose derived fibers and wherein $Ar^1$ is an aromatic group where the ether linkage and amine linkage are in a para arrangement and where Z and Z' are tetravalent organic radicals selected from the group consisting of a carbocyclic-aromatic containing radical and a heterocyclic-aromatic containing radical where each anhydride group is located on an aromatic ring with the carbonyl units in an ortho orientation relative to one another and Q is a divalent organic radical selected from the group consisting of an aliphatic radical having at least two carbon atoms, a carbocyclic aliphatic radical, a carbocyclic aromatic containing radical and a heterocyclic containing radical.

2. The composite of claim 1 wherein the polyimide has only units of formula IV.

3. The composite of claim 1 wherein the fiber is a carbon fiber.

4. A process for making laminate composites based on a polyimide having a $T_g$ from 200°-260° C. and a $T_m$ of from 300°-360° C. and a difference between $T_g$ and $T_m$ from 40°-160° C., and thermoplastic properties comprising the steps of:
  (a) pre-pregging a fiber with a polyimide or a polyimide precursor solution, wherein the polyimide or polyimide precursor solution is characterized by having from about 1 to 100 mole percent of a repeat unit formula (IV)

and from about 99 to 0 mole percent of a repeat unit of formula (V);

and wherein $Ar^1$ is an aromatic group where the ether linkage and amine linkage are in a para arrangement and where Z and Z' are tetravalent organic radicals selected from the group consisting of a carbocyclic-aromatic containing radical and a heterocyclic-aromatic containing radical where each anhydride group is located on an aromatic ting with the carbonyl units in an ortho orientation relative to one another and Q is a divalent organic radical selected from the group consisting of an aliphatic radical having at least two carbon atoms, a carbocyclic aliphatic radical, a carbocyclic aromatic containing radical and a heterocyclic containing radical;
  (b) heating the pre-pregged fiber to yield an imidized fiber;
  (c) layering the imidized fiber on top of one another in any combination of orientations into a composite; and
  (d) curing the composite to impart thermoplastic properties by autoclaving or compression molding wherein the compression molding temperature is from 300°-350° C. and from 2000-3500 psi and wherein the autoclave temperature is from 300°-350° C. and from 100-300 psi.

5. The process of claim 4 Wherein the polyimide precursor is convertable into the polyimide by imidization.

6. The process of claim 4 wherein the polyimide or polyimide precursor is characterized by having only repeat units of formula (IV).

7. The process of claim 4 wherein the fiber is selected from the group consisting of carbon fibers, polyamide fibers, polyester fibers, polyimide fibers, cellulose fibers and cellulose derived fibers.

8. The process of claim 4 wherein the fiber is a carbon fiber.

* * * * *